United States Patent [19]

Irwin

[11] Patent Number: 4,957,597
[45] Date of Patent: Sep. 18, 1990

[54] CONVEYOR BELT FOR TURN CONVEYORS

[75] Inventor: Guy L. Irwin, Oreland, Pa.
[73] Assignee: I. J. White Co., Farmingdale, N.Y.
[21] Appl. No.: 409,691
[22] Filed: Sep. 20, 1989
[51] Int. Cl.⁵ ............................................. B65G 15/02
[52] U.S. Cl. .................................... 198/831; 198/848
[58] Field of Search ......................... 198/831, 848–853

[56] References Cited

U.S. PATENT DOCUMENTS

| | | | |
|---|---|---|---|
| 2,769,531 | 11/1956 | Guba | 198/848 |
| 2,855,091 | 10/1958 | Frandsen | 198/831 |
| 4,260,053 | 4/1981 | Onodera | 198/831 |
| 4,867,301 | 9/1989 | Roinestad et al. | 198/831 |
| 4,878,362 | 11/1989 | Tyree | 198/831 |

Primary Examiner—Joseph E. Valenza
Attorney, Agent, or Firm—Morrison Law Firm

[57] ABSTRACT

A fixed radius conveyor belt for turn conveyors has a radially positioned plurality of rods which are wrapped with helically wound filaments bridging spaces between the rods to prevent conveyed objects from falling through the spaces between the rods. The filaments are maintained in the radial space between links which are attached to the rods at their ends close to an inside edge, and retainers attached at the ends of the rods close to an outside edge of the belt. The links engage one sprocket wheel of a conveyor, and the second wheel of the conveyor engages rods in an area adjacent to the retainers. Such an arrangement results in a belt which is structurally strong and can withstand conveyor jams and other irregularities in the conveying action without disintegration of the belt structure. The relatively simple construction of the belt permits easy assembly and allows production at a relatively low cost.

13 Claims, 2 Drawing Sheets

CONVEYOR BELT FOR TURN CONVEYORS

BACKGROUND OF THE INVENTION

The present invention relates to conveyors. More particularly, it relates to turn conveyor belts.

A typical conveyor system has straight sections and curved sections. The curved sections of a conveyor system are called "turn conveyors" and are independent conveyor units. Their purpose is to transfer the transported items in the angled directions, usually to continue their transportation on another straight section of the conveyor system. Therefore, turn conveyors usually connect an incoming straight section of the conveyor system with an outgoing straight section.

One of the significant characteristics of such a turn conveyor is its ability to occupy as little space as possible. It must also be able to transfer a transported item from and to straight sections of the conveyor system without dropping it. However, if a turn conveyor section is made up of parallel wires or rods, a small item may fall between the wires or rods if the spacing is large enough.

One type of belt used in turn conveyors is known having a body consisting of rods. The ends of each rod are bent at about ninety degrees and are bent again to form hook-like loops to connect to the adjacent rod. The bent portion at the outer end of each rod extends slightly further in the conveying direction than does the bent portion at the inner end. This forms an arc whose radius depends on the difference between the inner and outer bent portions.

Sprocket wheels engage the belt at inner and outer edges of conveyor. The belt described above is very simple, and cheap to make. However, small items can fall between the rods, particularly near the outer edge, where the spacing is largest.

To prevent transported items from falling through rod-type conveyor belt, some belts of the prior art use straight, not bent rods with the wire loops connecting adjacent rods, thereby forming a mesh to retain the transported items on the belt. However, this type of the belt is easily destroyed when there is any jam or other irregularity in the conveying action. Also, this type of conveyor is relatively expensive compared to one made of plain interconnected rods.

In an another type of prior art belt, the rods have a wire mesh held in place by steel links. This belt has straight rods which can telescope at one edge. This type of belt is even more expensive and requires extra space.

OBJECTS AND SUMMARY OF THE INVENTION

Accordingly, it is an object of the invention to provide a conveyor belt for turn conveyors which overcomes the drawbacks of the prior art.

It is a further object of the invention to provide a conveyor belt for turn conveyors which reduces the physical space occupied by a turn conveyor.

It is a still further object of the invention to provide a conveyor belt for turn conveyors which transports objects without letting them fall through the spaces in a belt.

It is a still further object of the invention to provide a conveyor belt for turn conveyors which has a fixed radius and a wire mesh securely held in place.

It is a still further object of the invention to provide a fixed radius conveyor belt for turn conveyors which has a wire mesh connected to horizontally oriented rods, which does not get damaged in a case of a jam or in case of an irregularity in the conveying.

It is still further object of the invention to provide a reasonably priced conveyor belt for turn conveyors which is reliable, simple to assemble, and which does not get damaged during jams or irregularities in conveyor operation.

Briefly stated, the present invention provides a fixed radius conveyor belt for turn conveyors which has a radially positioned plurality of rods which are wrapped with helically wound filaments bridging spaces between the rods to prevent conveyed objects from falling through the spaces between the rods. The filaments are maintained in the radial space between links which are attached to the rods at their ends close to an inside edge, and retainers attached at the ends of the rods close to an outside edge of the belt. The links engage one sprocket wheel of a conveyor, and the second wheel of the conveyor engages rods in an area adjacent to the retainers. Such an arrangement results in a belt which is structurally strong and can withstand conveyor jams and other irregularities in the conveying action without disintegration of the belt structure. The relatively simple construction of the belt permits easy assembly and allows production at a relatively low cost.

According to an embodiment of the invention, there is provided a fixed radius turn conveyor belt comprising: a radially positioned plurality of spaced rods, the rods having inside and outside ends, the ends forming inside and outside edges, wherein a radius of the inside edge is less than a radius of the outside edge, links attached to the rods adjacent the inside ends, the links being effective to interact with a sprocket wheel driving the belt, wherein the outside ends are bent to movably connect the rods with each other, and the inside ends are straight and movably connected to each other by the links.

According to an embodiment of the invention, there is provided a fixed radius turn conveyor belt comprising: a radially positioned plurality of spaced rods, the rods having inside and outside ends, the ends forming inside and outside edges, wherein a radius of the inside edge is less than a radius of the outside edge, filaments over at least some adjacent ones of the rods covering spaces between the rods, links attached to the rods adjacent the inside ends, the links defining a position of the filaments relative to the inside edge, the links being effective to interact with a sprocket wheel driving the belt, wherein the outside ends are bent to movably connect the rods with each other, and the inside ends are straight and movably connected to each other by the links, and retainers on the rods adjacent to the outside ends, the retainers defining a position of the filaments relative to the outside edge.

According to a feature of the invention, there is provided a fixed radius turn conveyor belt comprising: a radially positioned plurality of spaced rods, the rods having inside and outside ends, the ends forming inside and outside edges, wherein a radius of the inside edge is less than a radius of the outside edge, a metal helically wound wire wrapped around at least two of the rods and positioned to cover spaces between the rods, links attached to the rods adjacent the inside ends at the links, first end, each of the links being movably connected to an adjacent rod at the link's another end, the links defining a position of the wire relative to the inside edge, the links being effective to interact with a sprocket wheel driving the belt, retainers attached to the rods adjacent to the outside ends, the retainers defining a position of the wire relative to the outside edge, wherein the outside ends are bent into hooks to movably connect the rods with each other in such a way that relatively constant distance is maintained between the outside ends so the radius of the outside edge is maintained to be greater than the radius of the inside edge, and the inside ends are straight and movably connected to each other by the links.

According to a feature of the invention, there is provided a fixed radius turn conveyor belt comprising: a radially positioned plurality of spaced rods, the rods having inside and outside ends, the ends forming inside and outside edges, wherein a radius of the inside edge is less than a radius of the outside edge, links attached to the rods adjacent the inside ends, the links being effective to interact with a sprocket wheel driving the belt, wherein the inside and outside ends are movably connected to each other by links.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT.

Figure 1:
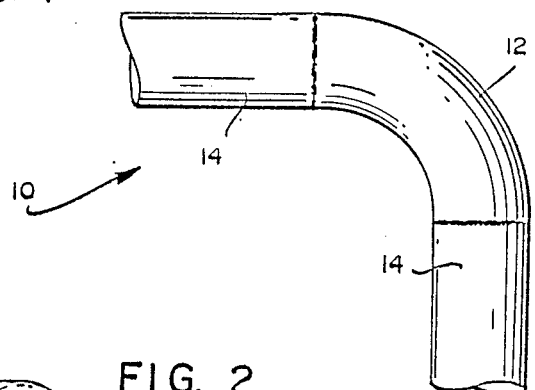
FIG. 1 is a schematic view of a conveyor system having straight and turn conveyors.

Referring to FIG. 1, there is shown, generally at 10, a conveyor system having straight and turn conveyors. To make a turn, turn conveyor 12 is placed adjacent to straight conveyor 14. After the turn, another straight conveyor 14 is placed next to turn conveyor 12. Turn conveyor 12 is usually an independent conveyor driven with the help of one or more sprocket wheels.

Figure 2:
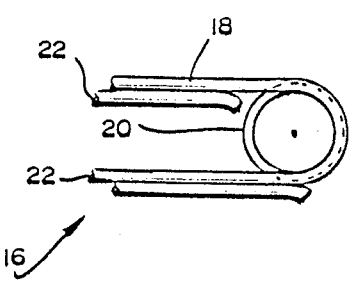
FIG. 2 is a side view of part of a moving mechanism of a conveyor.

Referring to FIG. 2, there is shown, generally at 16, a side view of a moving mechanism of a conveyor 16. A sprocket wheel 20 engages and drives a conveyor belt 18. Upper and lower support rails 22 support the runs of conveyor belt 18.

Figure 3:
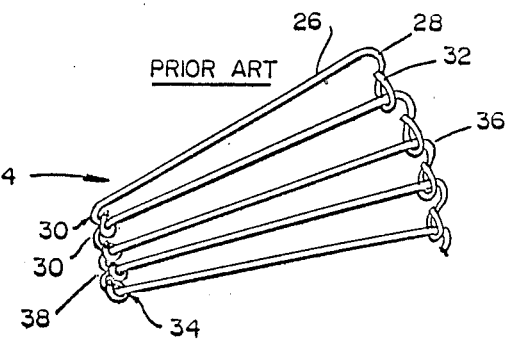
FIG. 3 is a top view of a prior art conveyor belt for turn conveyors.

Referring to FIG. 3, there is shown, generally at 24, a portion of a prior art belt for turn conveyors 24. It is a so-called "fixed radius" belt, which does not change its radius in the process of conveying. It consists of rods 26 having outside bent portion 28 and inside bent portion 30 which end in outside portion hooks 32 and inside portion hooks 34, respectively. These outside portion hooks 32 and inside portion hooks 34 serve to attach each rod 26 to its neighbor. In turn, outside bent portion 28 of rods 26 form outside edge 36, and inside portion hooks 34 of rods 26 form inside edge 38 of prior art belt for turn conveyors 24. The radius of outside edge 36 is greater than radius of inside edge 38, whereby turn conveyor 24 is able to transport items on a curve.

The prior art belt shown at FIG. 3 has some advantages. For example, it is a relatively low in cost and has relatively few parts. However, spaces between rods 26 are quite substantial, especially near outside edge. This may permit smaller parts to fall through the belt. This is a very serious disadvantage, limiting the application of the above belt.

Figure 4:
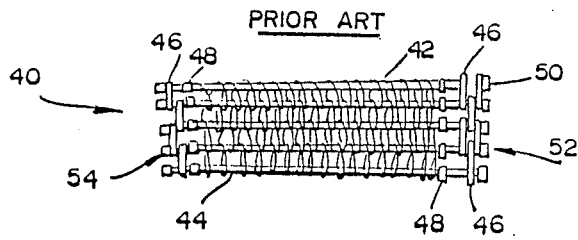
FIG. 4 is a top view of a prior art conveyor belt for turn conveyors.

Referring to FIG. 4, there is shown, generally at 40, a prior art belt for turn conveyors. It consists of rods 42 having wire mesh 44 woven around rods 42. The interconnecting of rods 42 is done with the help of straight links 46. To hold wire mesh 44 in place, plastic retainers 48 are placed on rods 42 at their one end. Usually, plastic stoppers 50 cover the ends of rods 42 which form outside edge 52. The bare ends of rods 42 form inside edge 54. This belt is also fixed radius belt, wherein outside edge 52 has a greater radius than inside edge 54.

The prior art belt of FIG. 4 has serious disadvantages. Due to its specific structure, it is very sensitive to irregularities in the conveying action. In case of such irregularity or a jam, wire mesh 44 is displaced, rods 42 may get bent, and straight links 46 disengage. In addition to the material damage, it may take considerable amount of time and manpower to repair the damage and return the conveyor to operation.

Figure 5:
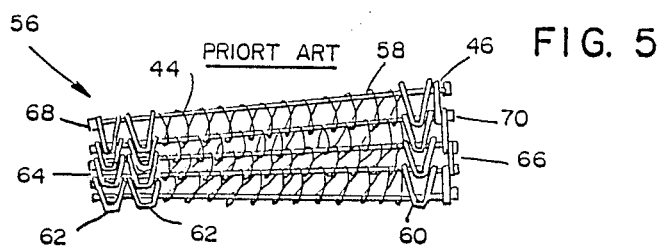
FIG. 5 is a top view of a prior art conveyor belt for turn conveyors.

Referring to FIG. 5, there is shown, generally at 56, a further prior art belt for turn conveyors. It consists of rods 58 covered with wire mesh 44. Configured links with elongated slots 60 are placed at one end of wire mesh 44,. The elongated slots of configured links with elongated slots 60 allow rods 58 to move to allow outside edge 66 to assume a curved shape. This also results in the curved shape for inside edge 64. At the same time, configured links 62 do not permit expansion of the prior art belt for turn conveyors 56 in the area of inside edge 64. The belt also has straight links 46 for more reliable construction. The tips of straight links 46 have metal buttons 70 on their outside edge 66. Metal buttons 70 are welded on inside edge 64 with welds 68. Only configured links 62 on the inside are driven by sprockets. The main purpose of configured links with elongated slots 60 is to control the belt's expansion. This belt is not a fixed radius belt, and it may change from straight to curved depending on the need.

The variable radius belt of the prior art of FIG. 5 has serious drawbacks. Firstly, before it can be tuned in an arc, this belt must run straight for about twice its width. This necessitates having a turn conveyor with straight, as well as curved, portions. As a result, a turn conveyor of such construction is significantly bulkier and occupies more space than a conveyor having just a curved portion. Secondly, the above belt has a many parts, requires more time to assemble, and requires a large number of individual welds. Thus this belt is expensive.

Figure 6:
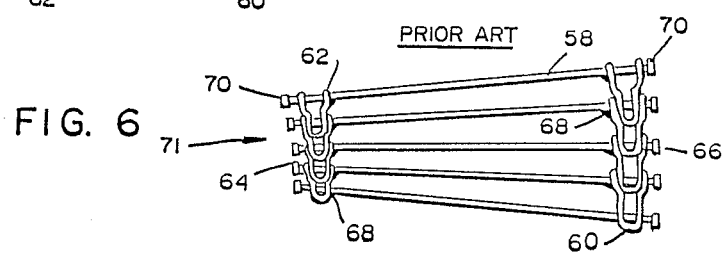
FIG. 6 is a top view of a prior art conveyor belt for turn conveyors.

Referring to FIG. 6, there is shown, generally at 71, still another prior art belt suitable for use with the turn conveyors. It is a so-called variable radius belt. It consists of rods 58' with attached configured links with elongated slots 60' on one side and configured links 62' on the other side. On their ends, rods 58' have metal buttons 70'. Configured links with elongated slots 60' and configured links 62' are attached to rods 58' with weld 68'. Ends of rods 58' form inside edge 64' and outside edge 66'. Due to the presence of elongated slots in configured links with elongated slots 60', rods 58' can move relative to each other and outer edge 66', can assume arcs of variable radii.

This belt has disadvantages common to all variable radius belts, as was described above.

Figure 7:
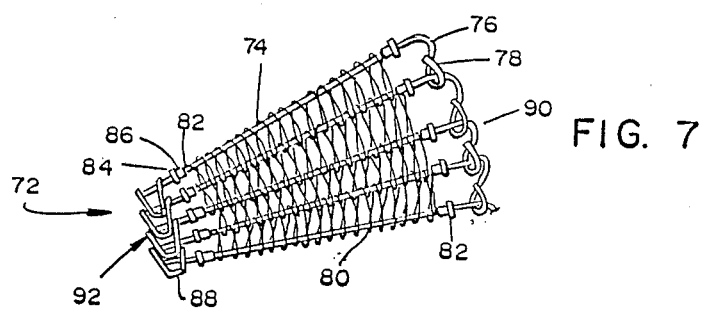
FIG. 7 is a top view of a conveyor belt for turn conveyors of the present invention.

Referring to FIG. 7, there is shown, generally at 72, a belt for turn conveyors according to the invention. It consists of rods 74 having outside bent portions 76 which end on one side with inside bent portions 78. The combination of outside bent portions 76 and inside bent portions 78 performs a dual function. Firstly, inside bent portions 78 connect rods 74 with each other. Secondly, outside bent portions 76 co-acts with inside bent portion 78 of the adjacent rod is such a way that although the connection of inside bent portion 78 with rods 74 is not rigid, the distance between rods 74 at their ends close to outside edge 90 remains relatively constant and greater than the distance between rods 74 at their ends close to inside edge 92, so the radius of outside edge 90 remains greater than the radius of inside edge 92. The other side of rods 74 is straight.

To prevent parts from falling between rods 74, wire 80 is wrapped around adjacent pairs. Wire 80 preferably consists of a helically wound wire, and most preferably it is tapered—i.e., the diameter of helix increases from inside edge 92 to outside edge 90. In the embodiment of FIG. 7, helical metal wire 80 is wrapped around pairs of rods 74. However, any type of filaments or wrappings, like, for instance, a plastic filaments, may be used to prevent the parts from falling down the conveyor belt.

To insure that wire 80 is securely held in place, retainers 82 are placed on the portion of rods 74 close to outside edge 90, and configured links 88 are placed on the portions of rods 74 close to inside edge 92. In one of the embodiments of the invention, configured links 88 have a shape of a tapered "n" and are welded to the ends of rods 74 at its one end, while the second end of links 88 is movably connected to an adjacent rod. Configured links 88 may be attached to rods 74 by any suitable means such as, for example, by welding. The movable connection of configured links 88 with rods 74 is achieved by making holes in the other end of configured links 88 to permit rods 74 to pass therethrough. In another embodiment of the present invention, retainers 82 are placed on the portion of the rods 74 close to inside edge 92. The second function of configured links 88 is to engage sprocket wheel 20 as shown at FIG. 2. Therefore, configured links 88 are used for a dual function-to secure wire 80 and to engage sprocket wheel 20. The belt of the present invention is preferably driven by two sprocket wheels to prevent jams. The second sprocket wheel engages rods 74 in the area between retainers 82 and outside bent portion 76.

In one of the embodiments of the invention, retainers 82 consist of nut 84 and sleeve 86 and are slid on rods 74. To secure retainers 82 on rods 74, they are, preferably, welded to rods 74. However, retainers 82 may be attached to rods 74 by any suitable means, and retainers 82 may have any suitable shape serving the purpose.

The belt of the present invention has many important advantages. Due to its construction, the belt of the present invention does not disintegrate if there is a jam or other irregularity in the conveying action. The filaments prevent parts from falling through rods, and at the same time, the filaments wrapped around rods are securely held in place between the configured links and retainers. Therefore, in the case of a jam, the filaments are not displaced.

It is also a fixed radius belt and forms a conveyor which occupies as small a space as possible. It has relatively few parts, and its assembly is simple. This permits making this belt at relatively low cost.

The assembly of the belt is usually started with inside bent portion 78 and outside bent portion 76. Then, retainers 82 are placed on rods 74. After that, helical wire 80 is placed on rods 74. The assembly is continued with placing of configured links 88 which can be preceded, optionally, with placing of another retainers 82 at the portion of rods 74 close to inside edge 92.

The present invention combines the simplicity of the straight-rod system of FIG. 3 with the advantages of the link-connected system of FIG. 5. That is, rods 74 can be preassembled at their outer edges as shown, while leaving the inner ends of rods 74 free for the slipping on outer retainers 82 and the helices of wire 80. Once wire 80 is in place, inner retainers 82 and configured links 88 are installed. Outer retainers 82 hold wire 80 inward from the outer ends of rods 74, thereby leaving a space for engagement of rods 74 by sprocket wheels (not shown).

In one embodiment of the invention, both inner and outer retainers 82 are welded in place. Welding may not be required, particularly in the case of outer retainers 82. In order to avoid welding, sleeves 86 may be made long enough to bear against outside bent portions 76. This positions nuts 84 in an inward position to hold wire 80 clear for contact by a drive sprocket. It is foreseen that, in this embodiment the drive sprocket contacts sleeves 86. To accommodate the extra thickness of sleeves 86 over rod 74, the diameters of rods 74 may be reduced so that the outer diameters of sleeves 86 can be reduced to a value equalling the normal diameters of rods 74. In this way, the drive sprocket contacts the same diameter as in the case where outer retainers are welded in place.

Figure 8:
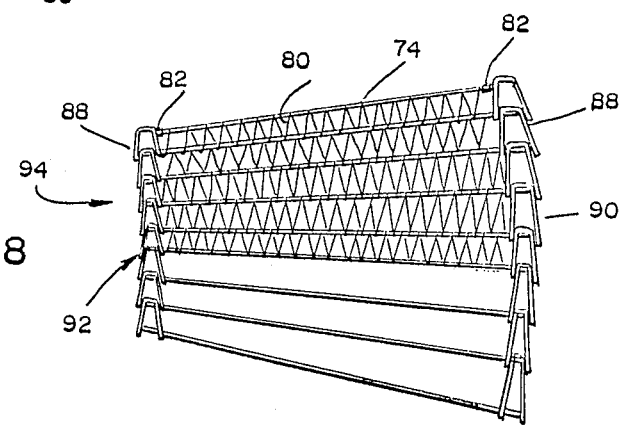
FIG. 8 is a top view of a conveyor belt for turn conveyors of the present invention.

Referring to FIG. 8, there is shown, generally at 94, a belt for turn conveyors according to the invention. It consists of rods 74 having configuired links 88 on their ends forming outside edge 90 and inside edge 92. Configuired links 88 perform a dual function. Firstly, they connect rods 74 with each other. Secondly, they co-act with rods 74 in such a way that although the connection of configuired links 88 with rods 74 is not rigid, the distance between rods 74 at their ends close to outside edge 90 remains relatively constant and greater than the distance between rods 74 at their ends close to inside edge 92, so the radius of outside edge 90 remains greater than the radius of inside edge 92.

Configuired links 88 also perform still another function: they engage sprocket wheel 20 as shown at FIG. 2.

To prevent parts from falling between rods 74, wire 80 is wrapped around adjacent pairs. Wire 80 preferably consists of a helically wound wire, and most preferably it is tapered—i.e., the diameter of the helix increases from inside edge 92 to outside edge 90. In the embodiment of FIG. 8, helical metal wire 80 is wrapped around pairs of rods 74. However, any type of filaments or wrappings, like, for instance, a plastic filaments, may be used to prevent the parts from falling down the conveyor belt.

To insure that wire 80 is securely held in place, retainers 82 may be placed on the portion of ro 74 close to outside edge 90 and inside edge 92.

In one of the embodiments of the invention, configured links 88 have a shape of a tapered "n" and are welded to the ends of rods 74 at its one end, while the second end of links 88 is movably connected to an adjacent rod. Configured links 88 may be attached to rods 74 by any suitable means such as, for example, by welding. The movable connection of configured links 88 with rods 74 is achieved by making holes in the other end of configured links 88 to permit rods 74 to pass therethrough.

As it was already mentioned, configured links 88 are used for a dual function-to secure wire 80 and to engage sprocket wheel 20. The above embodiment of the belt of the present invention is preferably driven by two sprocket wheels to prevent jams.

Similarly to the preceding embodiment of the invention, retainers 82 may consist of nut 84 and sleeve 86 (see FIG. 7) and may be slid on rods 74. To secure retainers 82 on rods 74, they may be welded to rods 74. However, retainers 82 may be attached to rods 74 by any suitable means, and retainers 82 may have any suitable shape serving the purpose.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fixed radius turn conveyor belt comprising:
    a radially positioned plurality of spaced rods, said rods having inside and outside ends, said ends forming inside and outside edges, wherein a radius of said inside edge is less than a radius of said outside edge;
    filaments over at least some adjacent ones of said rods covering spaces between said rods;
    links attached to said rods adjacent said inside ends, said links defining a position of said filaments relative to said inside edge, said links being effective to interact with a sprocket wheel driving said belt;
    wherein said outside ends are bent to movably connect said rods with each other, and said inside ends are straight and movably connected to each other by said links; and
    retainers on said rods adjacent to said outside ends, said retainers defining a position of said filaments relative to said outside edge.

2. The belt of claim 1, wherein said filaments are made of wire, and said links have a shape of a tapered "n".

3. The belt of claim 2, wherein said retainers consist of a sleeve which has an internal diameter fitted over a rod, and a stopper attached to said sleeve having a dimensions greater than diameter of said sleeve.

4. The belt of claim 3, wherein said links are welded to said rods.

5. The belt of claim 3, wherein said wire is a metal tapered helically wound wire, a diameter of a helix thus formed increases towards said outside edge.

6. The belt of claim 1, further comprising retainers on said rods adjacent said inside ends.

7. The belt of claim 6, wherein said filaments are made of wire, and said links have a shape of a tapered "n".

8. The belt of claim 7, wherein said retainers consist of a sleeve which has an internal diameter fittable over an external diameter of said rods, and a stopper attached to said sleeve having a dimension greater than an outer diameter of said sleeve.

9. The belt of claim 8, wherein said wire is a metal tapered helically wound wire having a diameter increasing toward said outside edge.

10. The belt of claim 6, wherein said links are welded to said rods.

11. A fixed radius turn conveyor belt comprising:
    a radially positioned plurality of spaced rods, said rods having inside and outside ends, said ends forming inside and outside edges, wherein a radius of said inside edge is less than a radius of said outside edge;
    a metal helically wound wire wrapped around at least two of said rods and positioned to cover spaces between said rods;
    links attached to said rods adjacent said inside ends at aid links' first end, each of said links being movably connected to an adjacent rod at said link's another end, said links defining a position of said wire relative to said inside edge, said links being effective to interact with a sprocket wheel driving said belt;
    retainers attached to said rods adjacent to said outside ends, said retainers defining a position of said wire relative to said outside edge;
    wherein said outside ends are bent into hooks to movably connect said rods with each other in such a way that relatively constant distance is maintained between said outside ends so said radius of said outside edge is maintained to be greater than said radius of said inside edge, and said inside ends are straight and movably connected to each other by said links.

12. A fixed radius turn conveyor belt comprising:
    a radially positioned plurality of spaced rods, said rods having inside and outside ends, said ends forming inside and outside edges, wherein a radius of said inside edge is less than a radius of said outside edge;
    links attached to said rods adjacent said inside ends, said links being effective to interact with a sprocket wheel driving said belt;
    wherein said outside ends are bent to movably connect aid rods with each other, and said inside ends are straight and movably connected to each other by said links.

13. The belt of claim 12, wherein said links have a shape of a tapered "n".

* * * * *